Sept. 9, 1952        F. LAURENT        2,609,727
OBJECT-GLASS WITH A VARIABLE FOCAL LENGTH
Filed Jan. 5, 1949        3 Sheets—Sheet 1

François Laurent
INVENTOR

By Robert E. Burns
ATTORNEY

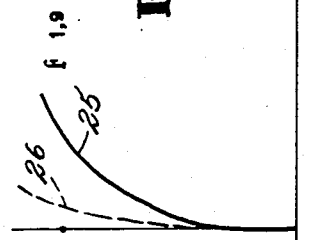
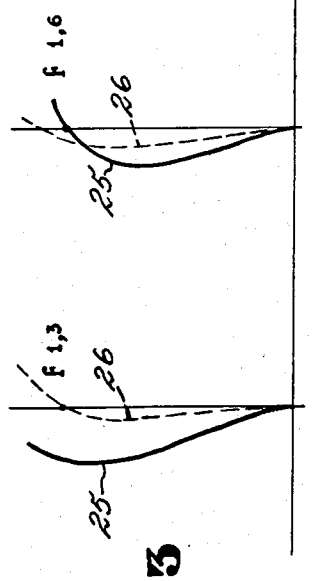

Sept. 9, 1952     F. LAURENT     2,609,727
OBJECT-GLASS WITH A VARIABLE FOCAL LENGTH
Filed Jan. 5, 1949     3 Sheets-Sheet 3
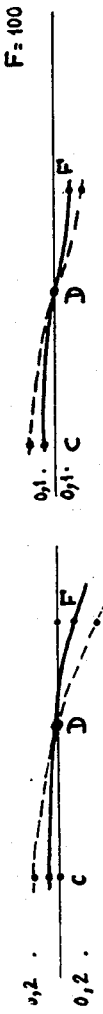
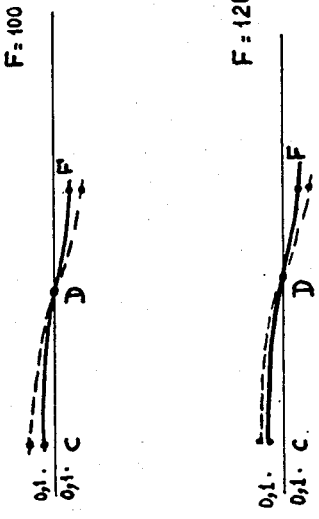
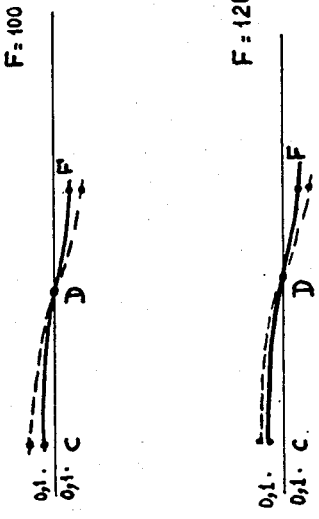
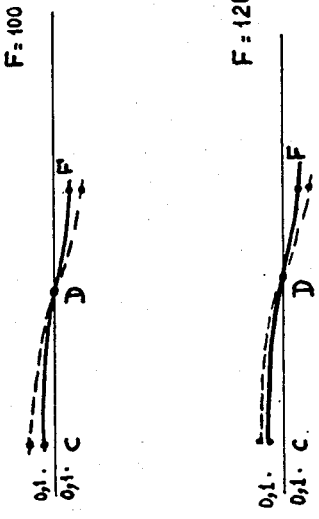

Patented Sept. 9, 1952

2,609,727

UNITED STATES PATENT OFFICE 2,609,727

OBJECT-GLASS WITH A VARIABLE FOCAL LENGTH

François Laurent, Paris, France, assignor to Etablissements Emel, Paris, France, a French company Application January 5, 1949, Serial No. 69,285
In France January 10, 1948

1 Claim. (Cl. 88—57)

Object-glasses have been known already for a long time in which a variation of the focal length may be obtained by shifting one of the elements with respect to the others. Though a small variation of the spacing of the elements can determine a comparatively high variation of the focal length, said object-glasses are not entirely satisfactory owing to the fact that the corrections are insured in a convenient manner only for a single value of the spacing or for a small variation of this spacing.

The invention relates to an object-glass with a variable focal length characterized in that it comprises a positive front group formed of a positive front lens and a negative rear lens separated by a variable air space from a positive rear group, which forms an object-glass with a variable focal length which is well corrected for a considerable extent of the values of the focal length.

According to a form of execution the rear group is formed of a single lens which reduces the number of the air-glass interfaces.

Other features will appear in the course of the following description.

In the appended drawing given by way of example:

Figures 3, 4 and 5 show the curves of spherical aberration and of aberration of the sines of known object-glasses.

Figures 6, 7 and 8 show the corresponding curves of the object-glass in accordance with the invention.

Figures 9, 10 and 11 show the curves of chromatic aberration of known object-glasses.

Figures 12, 13 and 14 show the corresponding curves of the object-glass in accordance with the invention.

Figure 1:
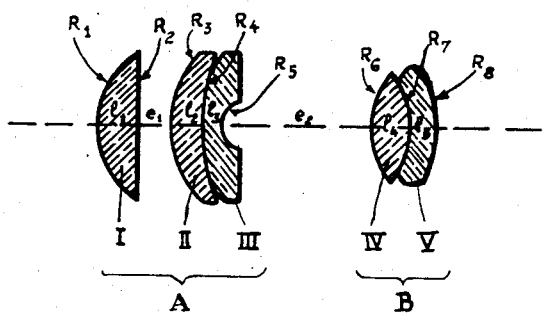
Figure 1 is a diagrammatical view showing an object-glass made in accordance with the invention.

As shown in Figure 1 the object-glass made in accordance with the invention comprises three lenses which form a front group A and a rear group B separated by an air space $e_2$ (of a variable thickness).

The front group A comprises a convergent front lens I and a divergent lens formed of two glasses II, III. The total power of the front group is positive.

The rear group B is formed of a single lens which comprises two glasses IV, V and has a total convergent power.

Each of the groups A and B can be compared with a simple convergent lens and the resulting focal length of the whole unit can be calculated by applying the typical formula:

$$F = \frac{f_1 \cdot f_2}{f_1 + f_2 - e_2}$$

where F is the resulting focal length, $f_1$ and $f_2$ are the focal lengths of each of the groups and $e_2$ the interstice.

When $e_2$ varies from 0 to $f_1$ the resultant formula F varies from $$\frac{f_1 \cdot f_2}{f_1 + f_2} \text{ to } f_1$$

By way of example if $f_1=50$ and $f_2=30$, F varies from 18.77 to 50.

The following table indicates the construction data of an object-glass having a variable focal length according to the invention. Of course, said values are indicated only by way of example.

The lens, the radii R, the thicknesses 1 of the lenses and the spacings e are numbered in the direction of the incident light. The second column of the table indicates the refractive index for the line D and the third column indicates the index of Abbe or dispersion coefficient (V) or (nu).

| Lenses | $n_D$ | nu or ($\nu$) | Radii in mm. | Thicknesses and spacings in mm. |
|---|---|---|---|---|
| I | 1.624 | 57 | $R_1=+124.8$<br>$R_2=\infty$ | $l_1=12.6$<br>$e_1=0.54$ |
| II | 1.523 | 58 | $R_3=+57.24$<br>$R_4=+86.11$ | $l_2=11.6$ |
| III | 1.624 | 36 | $R_4=+86.11$<br>$R_5=+44.12$ | $l_3=5.8$<br>$e_2=148$ |
| IV | 1.570 | 57 | $R_6=+74.5$<br>$R_7=-53.1$ | $l_4=22.5$ |
| V | 1.624 | 36 | $R_7=-53.1$<br>$R_8=-223.0$ | $l_5=5.7$ |

The radii have the sign + for the interfaces the convexity of which is orientated towards the incident light and the sign — for the interfaces the concavity of which is orientated towards the incident light.

Figure 2:
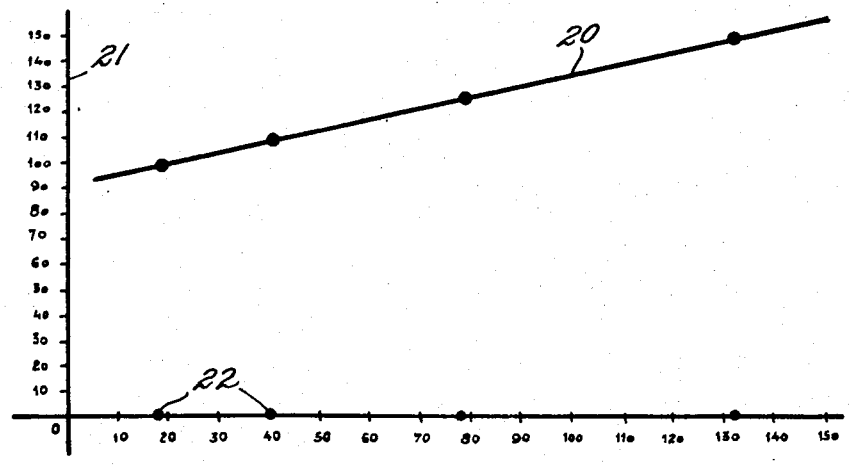
Figure 2 is the curve of variation of the focal length as a function of the spacing between the front group and the rear group of the object-glass.

For the above mentioned example the focal length varies from 100 to 149 as indicated by the curve 20 of Figure 2 where the abscissae 21 represent the values of the divergence $e_2$ in millimetres and the ordinates 22 the corresponding values of the focal length in millimetres.

Figures 3, 4 and 5 indicate the variations of the spherical aberration (in full lines) 25 and of the sines (in broken lines) 26 for an ordinary object-glass the focal length of which is 100, 120 and 140 respectively.

Figures 6, 7 and 8 indicate the same variations for the object-glass in accordance with the invention the divergence $e_2$ of which is regulated to convenient values in order to obtain focal lengths of 100, 120 and 140 respectively corresponding to the focal lengths of the object-glasses characterized by Figures 3, 4 and 5.

It is to be noted that the variations of the spherical aberration and the sines are substantially less for the object-glass in accordance with the invention.

Figures 9, 10 and 11 indicate the variations of the chromatism of position (in full lines) and of the chromatism of magnitude (in broken lines) calculated for the lines C, D and F for ordinary projection object-glasses of $f/1.5$ with the focal lengths 100, 120 and 140 respectively.

Figures 12, 13 and 14 indicate the variations of the same aberrations in an object-glass in accordance with the invention for the same focal lengths.

It is to be noted that in the object-glass in accordance with the invention the aberrations show only a small variation while in the known object-glasses these variations are comparatively important.

Furthermore, in the object-glass according to the invention the curves of variation of the chromatic aberration of magnitude and of the chromatic aberration of position are not much different from one another which is not the case in object-glasses the correspondent curves of which are indicated in Figures 9, 10 and 11.

It results from the comparison of the curves of Figures 6, 7 and 8 with the curves of Figures 3, 4 and 5 and from the comparison of the curves of Figures 12, 13 and 14 with the curves of Figures 9, 10 and 11 that the variations of the corrections of an object-glass according to the invention are substantially smaller than those of the known object-glasses.

The object-glasses in accordance with the invention give good images on the whole extent of the variation of the focal length.

Of course, the invention is not limited to the form of execution which has been described.

I claim:

In a variable focal length objective, a positive front group of a focal length $f_1$ comprising a positive front lens and two cemented lenses forming a divergent meniscus of positive convexity, said two cemented lenses being disposed behind the said positive front lens and separated therefrom by an air space of constant dimensions, a rear group of focal length $f_2$ comprising two cemented lenses, with an air space $e_2$ separating the said positive front group from the said rear group, said air space $e_2$ being adjustable between 0 and $f_1$ to permit adjustment of the focal length F of the assembly according to the equation:

$$F = \frac{f_1 \times f_2}{f_1 + f_2 - e_2}$$

whereby the focal length F varies between the value $$\frac{(f_1 \cdot f_2)}{f_1 + f_2} \text{ and } (f_1)$$

FRANÇOIS LAURENT.

REFERENCES CITED

The following references are of record in the file of this patent:

UNITED STATES PATENTS

| Number | Name | Date |
|---|---|---|
| 1,860,575 | Gehrke | May 31, 1932 |
| 1,880,394 | Altmann | Oct. 4, 1932 |
| 1,927,925 | Dieterich | Sept. 26, 1933 |
| 1,988,390 | Naumann | Jan. 15, 1935 |
| 2,042,815 | White | June 2, 1936 |
| 2,245,241 | Wood | June 10, 1941 |
| 2,271,227 | Lee | Jan. 27, 1942 |

FOREIGN PATENTS

| Number | Country | Date |
|---|---|---|
| 26,085 | France | Apr. 10, 1923 |
| | (1st addition to 517,014) | |
| 878,741 | France | Oct. 26, 1942 |